April 19, 1949.  O. B. WRIGHT ET AL  2,467,644
ATTACHMENT FOR HAND TRUCKS AND THE LIKE
Filed Aug. 14, 1946  3 Sheets-Sheet 1

Inventors
Orice B. Wright and
Ray E. Morton,

Attorney

April 19, 1949.  O. B. WRIGHT ET AL  2,467,644
ATTACHMENT FOR HAND TRUCKS AND THE LIKE
Filed Aug. 14, 1946  3 Sheets-Sheet 2
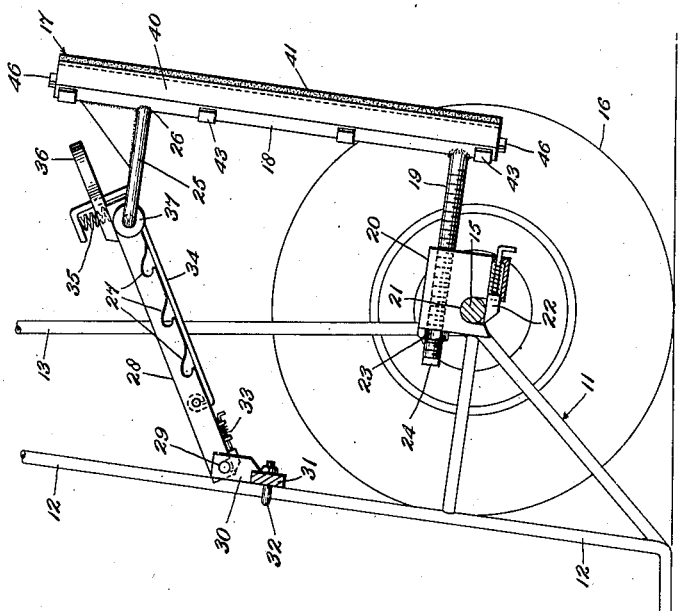
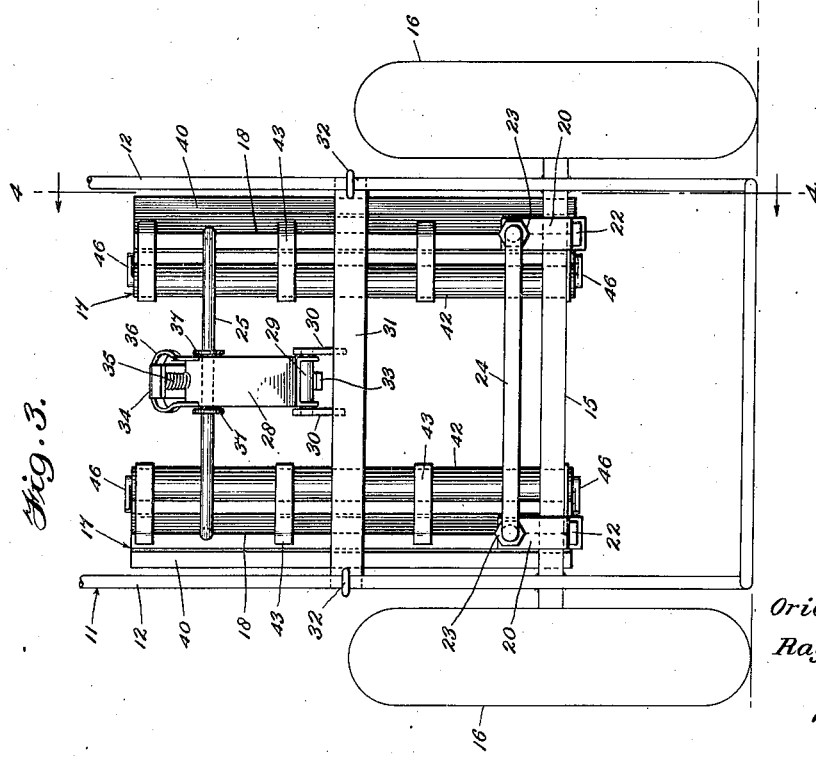
Inventors
Orice B. Wright
and
Ray E. Morton,
Attorney April 19, 1949.                O. B. WRIGHT ET AL                2,467,644
                    ATTACHMENT FOR HAND TRUCKS AND THE LIKE
Filed Aug. 14, 1946                                     3 Sheets-Sheet 3
Fig. 5.      Fig. 6.
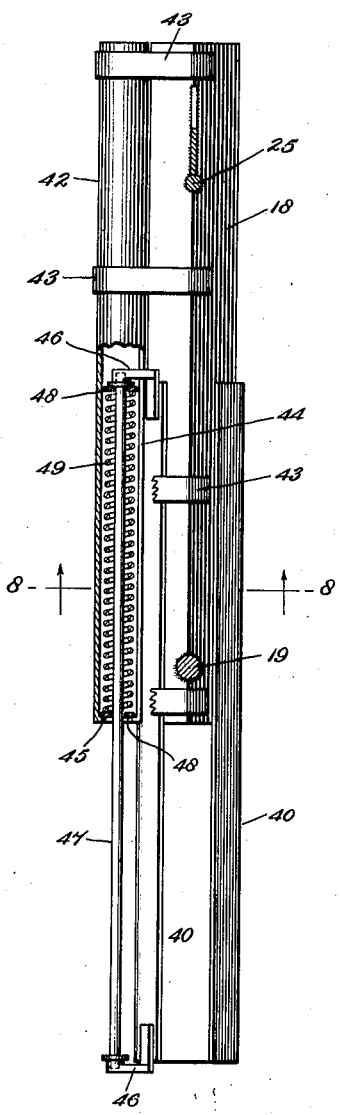
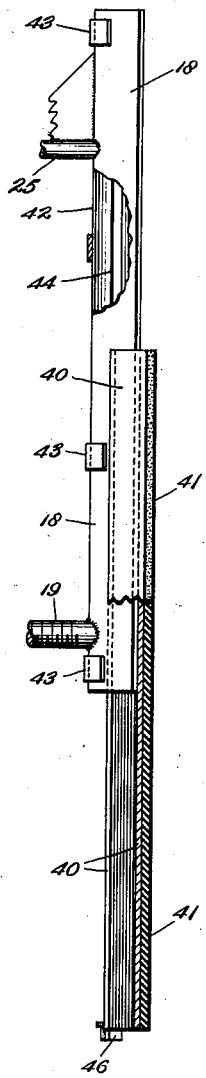
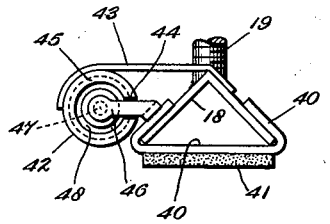
Fig. 7.
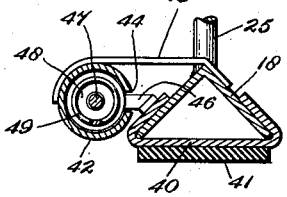
Fig. 8.
Inventors
Orice B. Wright and
Ray E. Morton,
Attorney Patented Apr. 19, 1949

2,467,644

UNITED STATES PATENT OFFICE 2,467,644

ATTACHMENT FOR HAND TRUCKS AND THE LIKE

Orice B. Wright and Ray E. Morton, Idaho Falls, Idaho

Application August 14, 1946, Serial No. 690,494

10 Claims. (Cl. 280—29)

The invention relates to attachments for hand trucks and the like, and has for its principal object the provision of a relatively simple and inexpensive device which may be readily attached to and detached from a wide variety of hand trucks, and which will materially facilitate the movements of such vehicles up and down curbings, flights of steps, etc.

A further object of the invention is to provide a device of the character described which is easily adjustable for accommodation to various sizes of wheels with which different trucks may be provided; and which may be readily collapsed from an operative position to an inoperative out-of-the-way position when desired, without detachment from the vehicle.

Various other objects and advantages will appear from the following description, taken in conjunction with the accompanying drawings forming a part of this specification, in which:

Fig. 3 is a front elevational view of the device and lower portion of the truck, on a somewhat larger scale;

Fig. 4 is a sectional-elevational view on the plane indicated by the line 4—4 of Fig. 3, looking in the direction of the arrows;

Fig. 5 is a front elevational view, partly broken away and in section, of one of the units of the attachment, the parts being illustrated in an extended position similar to that shown in Fig. 2;

Fig. 6 is a side elevational view, partly broken away and in section, of the parts shown in Fig. 5, looking from the right thereof;

Fig. 7 is an end elevational view of the unit, as seen from the lower end of Fig. 5; and Fig. 8 is a cross sectional view on the plane indicated by the line 8—8 of Fig. 5, looking in the direction of the arrows.

Figure 1:
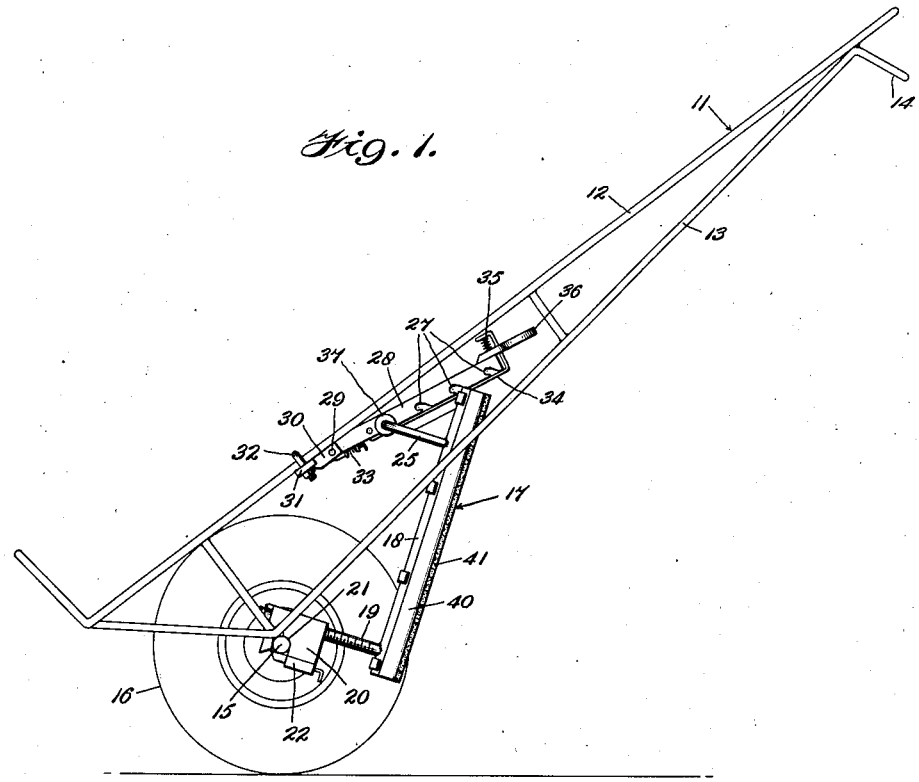
Figure 1 is a side elevational view of a conventional form of hand truck with a device constructed in accordance with the invention in place thereon, the attachment being shown in its collapsed or inoperative position.

Referring to the drawings more in detail, the hand truck shown is of a conventional construction, comprising a welded tubular metal frame which includes transversely spaced truss-like side elements 11 each composed of an upper load receiving member 12 and a lower bracing structure 13. The latter may be formed at their upper ends to provide hand grips 14, and adjacent their lower ends are welded to an axle 15 on which the wheels 16 are journalled.

The attachment constituting the invention comprises a pair of units 17 which are essentially duplicates of one another except that one is right hand and one left hand. Each of these units comprises a rail member 18, which may be of an angle-iron construction as shown, and to one end portion of which is welded a stud 19 upon which is threaded a block 20 having an open-faced recess 21 for the reception of the axle 15. Each block is provided with a spring catch 22 which normally engages and retains the axle seated in the recess, while at the same time permitting swinging movements of the block and rail on the axle, as well as providing for ready detachment of the device from the truck when desired. By adjusting the blocks 20 inwardly or outwardly on the threaded studs 19, the apparatus may be accommodated to truck wheels of various sizes, and lock nuts 23 may be provided to secure the blocks in any appropriate position. The ends of the studs 19 are rigidly tied together by a cross bar 24.

Adjacent their other ends the rails 18 are rigidly connected together by a U-shaped tie rod 25, the ends of the legs of which are welded to the respective rails as at 26. The central portion of the cross bar of this tie rod is receivable in any one of a series of notches 27 provided in a brace member 28, which is here shown as being of inverted channel iron construction. The brace member 28 is detachably pivotally mounted on a pin 29 carried by a pair of ears 30 rigidly attached to a cross bar 31 extending between and secured to the truck frame members 12 by U-bolts 32. A spring catch 33 readily removably retains the brace member 28 on the pin 29, and the said brace member is provided with a pivoted keeper bar 34, controlled by a spring 35, for retaining the tie rod 25 in any selected notch 27 of the brace member. With the tie-rod engaged in the outermost notch 27 the parts will be retained in the operative position shown in Figs. 2 and 4, while if the keeper 34 be pressed downwardly and the tie rod moved to engage in the innermost notch 27, the parts will be moved to and retained in the collapsed out-of-the-way position beneath the truck frame, illustrated in Fig. 1. The brace member 28 may be provided with a loop or handle 36 to facilitate movement thereof, and the cross member of the tie rod 25 may have disk-like flanges 37 rigidly secured to it, to guide the brace member, as will be readily understood.

A shoe 40 is slidably mounted on each rail member 18, the under faces of which shoes are preferably provided with pads or strips 41 of rubber or the like. Each rail also has a tubular housing 42 rigidly attached to it, the attachment in this instance being made by a plurality of straps 43 welded to each of the elements 18 and 42. Each housing is provided with a longitudinal slot 44 extending throughout its length and facing the adjacent rail 18; and the open ends of the housings are provided with inturned flanges or beads 45. A rod 47 is rigidly attached to each shoe 40, as by brackets 46 which extend through the housing slots 44, said rods being disposed axially of the respective housings 42 and loosely carrying washers 48 which serve as abutments for the ends of coiled compression springs 49 mounted within the housings. Expansion of these springs maintains the parts normally in the positions illustrated in Figs. 1, 3 and 4, with all of the washers 48 seated against their respective housing flanges 45.

In use the truck of course usually occupies an inclined position substantially as shown in Fig. 1, and as it approaches a curbing or a flight of steps the pads or strips 41 of the shoes 40 engage a corner thereof, whereby the movement of the shoes is arrested. As the operator continues to move the truck toward the right, as viewed in Fig. 2, the rails 18 slide in the said shoes, which thus serve as inclined supports or ways for the rails, as indicated in the said figure. During this movement the housings 42, being rigidly connected to the rails 18, move with them, while the brackets 46 and rods 47, being rigid with the shoes 40, remain stationary. As a result the springs 49 are compressed between the upper washers 48, backed by the upper brackets 46, and the lower washers 48 which remain seated on the lower housing flanges 45, as will be clear from Fig. 5. As the truck progresses upwardly to slightly beyond the position shown in Fig. 2, the truck wheels 16 will engage the corner of the curbing or step and then move onto the tread thereof, whereupon the shoes 40 will be released from their engagement with the said corner and the springs 49 will snap them upwardly to their normal positions, in readiness for a repetition of the cycle.

Figure 2:
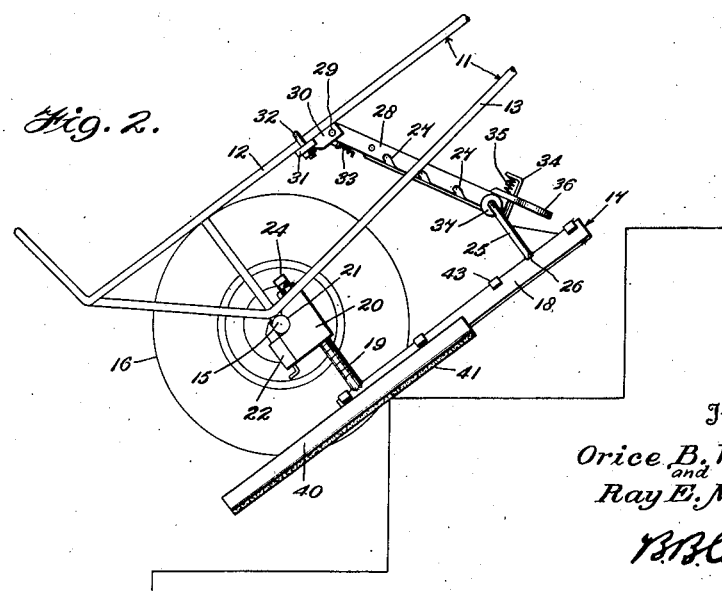
Fig. 2 is a fragmentary view similar to Fig. 1, but showing the device in its operative position and in the course of a movement of the truck upwardly of a flight of steps.

As will be readily understood, the device is double acting, i. e. it will function equally well in the opposite direction, and thus facilitate movement of the truck down a flight of steps. In this case however, the engagement between the shoes 40 and the step corner will be more to the left of the shoes than is shown in Fig. 2, and of course the movement of the rails 18 on the shoes will be to the left and downwardly, or in other words, the reverse of that shown in Figs. 2, 5 and 6.

If the truck is to be used only on level surfaces, the attachment may be conveniently swung upwardly to and retained in the out-of-the-way position of Fig. 1, as explained above.

What is claimed is:

1. In a device for facilitating movement of a hand truck on a flight of steps or the like, the combination of a pair of transversely spaced rail members; a shoe mounted on each rail member for relative reciprocation between the two; yieldable means normally maintaining a predetermined longitudinal relationship between the shoes and rail members; means for attaching the rail members to a truck for movements between an inoperative position adjacent the truck frame and an operative position adjacent the truck wheels, in which latter position the shoes may inclinedly engage the corner of a step as the truck approaches the same whereby their movement may be arrested while continued movement of the truck causes the rail members to move on the shoes as supports, against the action of said yieldable means; and means for retaining the rail members and shoes in either said operative or said inoperative position.

2. In a device for facilitating movement of a hand truck on a flight of steps or the like, the combination of a pair of transversely spaced rail members; a shoe mounted on each rail member for relative reciprocation between the two; yieldable means normally maintaining a predetermined longitudinal relationship between the shoes and rail members; means for pivotally attaching said rail members to a truck for swinging movements from an inoperative position beneath the truck frame to an operative position adjacent the truck wheels, in which latter position the shoes may inclinedly engage the corner of a step as the truck approaches the same, whereby their movement may be arrested while continued movement of the truck causes the rail members to move on the shoes as supports, against the action of said yieldable means; and a brace member securable to the truck frame and provided with means for maintaining the rail members and shoes in either said operative or said inoperative position at will.

3. In a device for facilitating movement of a hand truck on a flight of steps or the like, the combination of a pair of transversely spaced rail members; a shoe mounted on each rail member for longitudinal movements from and to a predetermined normal relationship; means for readily detachably securing one end of each rail member to the axle of a truck for swinging movements of the rail members and shoes between an inoperative position beneath the truck frame and an operative position adjacent the truck wheels, in which latter position the shoes may inclinedly engage the corner of a step as the truck approaches the same, whereby their movement may be arrested while continued movement of the truck causes the rail members to move on the shoes as supports; means for restoring the said normal relationship between the shoes and rail members upon disengagement of the shoes from the step; a brace member having means for readily detachably mounting it on the truck frame; and means for adjustably interconnecting said brace member and the other end of said rail members whereby the latter may be retained in either said operative or said inoperative position at will.

4. In a device for facilitating movement of a hand truck on a flight of steps or the like, the combination of a pair of transversely spaced rail members; a step engaging shoe mounted on each rail member for longitudinal reciprocation between the two; resilient connections between said shoes and rail members for yieldably maintaining a predetermined longitudinal relationship between them; a stud extending from an end portion of each rail member; and means carried by said studs for securing the rail members to a truck adjacent the wheels thereof, said means being adjustable on said studs whereby the device may be accommodated to truck wheels of various sizes.

5. A device according to claim 4, characterized by the securing means comprising members threaded upon the studs and having truck-axle engaging recesses; and catches carried by such members engageable with the axle to readily detachably retain the parts in position.

6. A device for facilitating movement of a hand truck up or down a flight of steps or the like, comprising a pair of rail members; a shoe mounted on each rail member for relative movement between the two in either direction from a normal intermediate position; means for attaching the rail members to a truck adjacent the wheels thereof for engagement of the shoes with the corner of a step as the truck approaches the same from either direction, whereby movement of the shoes may be arrested while continued movement of the truck causes the rail members to move in such direction from said normal position on the shoes as supports; and double acting resilient connections between the shoes and rail members for restoring the parts to said normal position upon disengagement of the shoes from the step.

7. In a device for attachment to a hand truck to facilitate movement thereof up and down flights of steps or the like, a rail member having means for attachment of the same to a truck in an inclined position adjacent a truck wheel; a step engaging shoe mounted on said rail member for relative longitudinal movement between the two in either direction from a normal position; a spring housing carried by said rail member; a spring mounted in said housing; and connections between said shoe and spring whereby the latter may restore the normal relationship between the shoe and rail member after displacement in either direction.

8. In a device for attachment to a hand truck to facilitate movement thereof up and down flights of steps or the like, a rail member having means for attachment of the same to a truck in an inclined position adjacent a truck wheel; a step engaging shoe slidably mounted on said rail member for movement in either direction from a normal position; a tubular spring housing attached to said rail member and having an abutment at each end; a coil spring disposed in said housing between said abutments; and means carried by the shoe and engaging the spring for compressing the latter against one of said abutments upon relative movement between the shoe and rail member in either direction.

9. In a device for attachment to a hand truck to facilitate movement thereof up and down flights of steps or the like, a rail member having means for attachment of the same to a truck in an inclined position adjacent a truck wheel; a step engaging shoe slidably mounted on said rail member for relative movement between the two in either direction from a normal position; a tubular spring housing attached to said rail member, having an abutment at each end and a longitudinal slot in its side wall; a coil spring disposed in said housing between said abutments; and bracket means carried by the shoe and working in said slot, for compressing the spring against one of said abutments upon relative movement between the shoe and rail member in either direction from said normal position.

10. In a device for attachment to a hand truck to facilitate movement thereof up and down flights of steps or the like, a rail member having means for attachment of the same to a truck in an inclined position adjacent a truck wheel; a step engaging shoe mounted on said rail member for relative movement between the two in either direction from a normal position; a tubular spring housing carried by said rail member, having a flange at each end and a longitudinal slot in its side wall; a coil spring disposed in said housing between said flanges; a bracket mounted by the shoe at each end thereof, arranged to work in said slot; a rod supported by said brackets co-axially of said spring and housing; and washers loosely mounted on said rod at the ends of the spring and engageable with said housing flanges.

ORICE B. WRIGHT.
RAY E. MORTON.

REFERENCES CITED

The following references are of record in the file of this patent:

UNITED STATES PATENTS

| Number | Name | Date |
|---|---|---|
| 368,263 | Wetmore | Aug. 16, 1887 |
| 970,787 | Brown | Sept. 20, 1910 |
| 2,337,683 | Rideout | Dec. 28, 1943 |